Aug. 18, 1931.     K. J. EVANS ET AL     1,819,598
MAIL BAG CARRIER
Filed Dec. 7, 1927
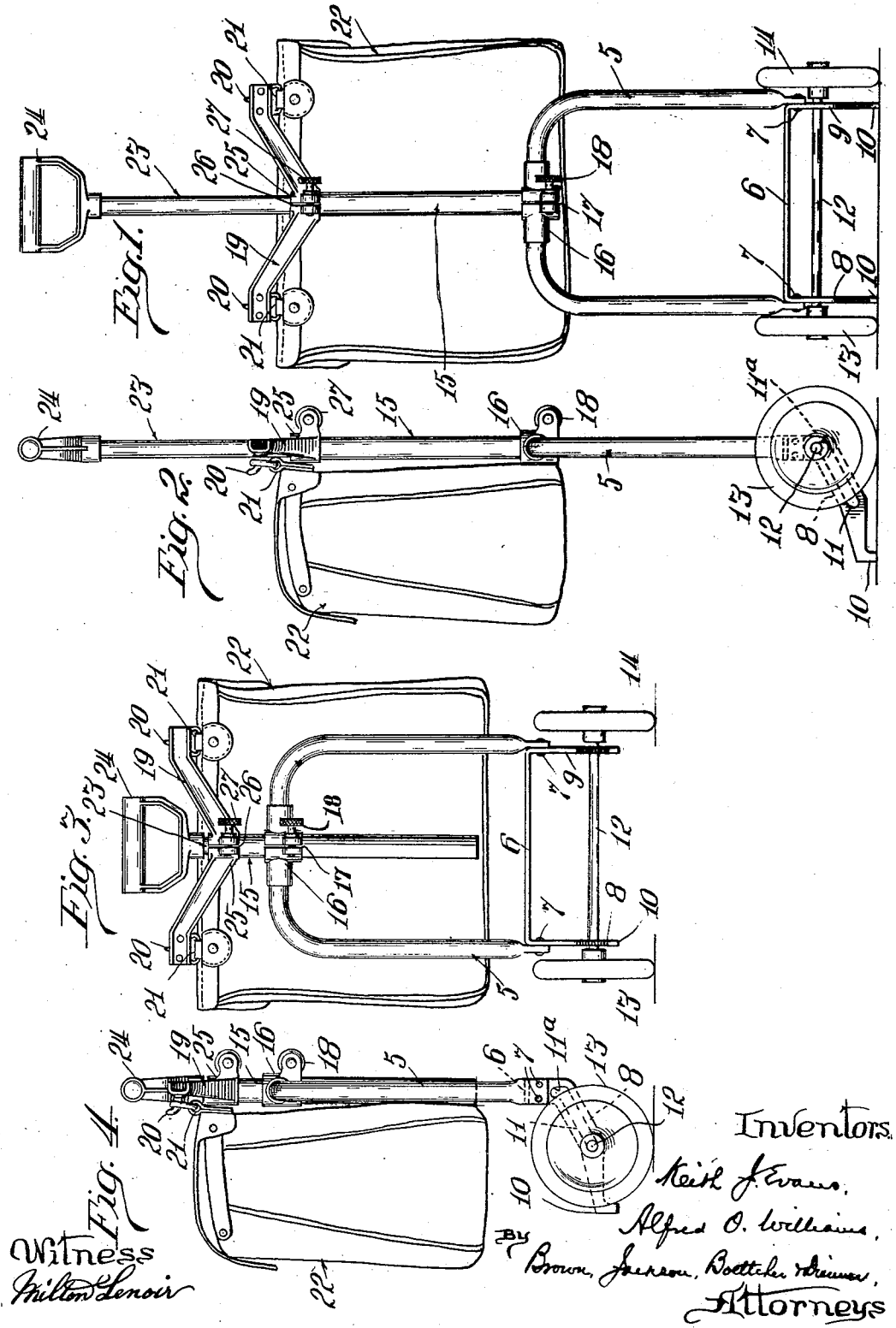
Inventors
Keith J. Evans
Alfred O. Williams
By Brown, Jackson, Boettcher & Dienner
Attorneys
Witness
Milton Lenoir Patented Aug. 18, 1931

1,819,598

UNITED STATES PATENT OFFICE

KEITH J. EVANS, OF CHICAGO, ILLINOIS, AND ALFRED O. WILLIAMS, OF BATTLE CREEK, MICHIGAN; SAID WILLIAMS ASSIGNOR TO SAID EVANS

MAIL BAG CARRIER

Application filed December 7, 1927. Serial No. 238,282.

Our invention relates to carriers of the truck type, and particularly to vehicles of that character that are adapted to be used to support load containers, such as bags, in a stationary position while they are being filled or emptied, and are also adapted to hold them while being transported from place to place. The particular purpose for which our invention is intended is to support and carry mail bags used by letter carriers in making their rounds, although it may also be applied to any other use for which it is adapted.

The object of our invention is to provide an improved bag carrier that will be light and strong in construction and will be capable of being used as a stand to support mail or other bags at a height low enough so that they can be conveniently filled or emptied, and which will be provided with wheels and an operating handle so that the carrier may serve as a truck in transporting the load from place to place. Also, to so construct the carrier that when not used as a truck it may conveniently be carried by hand with the wheels out of the way so that they do not interfere with its being conveniently carried. The nature of our improvements will more clearly appear from the following description of our improved carrier taken with the accompanying drawings, which illustrate the form in which we prefer to embody the invention.

In the drawings,—

Fig. 1 is a front elevation with the parts of the carrier extended and the wheels in the position they assume when the carrier is being used as a truck;

Fig. 2 is a side elevation with the parts in the position shown in Fig. 1;

Fig. 3 is a front elevation showing our improved carrier collapsed for carriage by hand, with the wheels in the position they then assume so as to be out of the way of the person by whom it is carried; and Fig. 4 is a side elevation of the parts in the position shown in Fig. 3.

Referring first to Figs. 1 and 2, it will be seen that our improved carrier comprises an inverted U-shaped frame 5, preferably of tubular construction, the lower ends of the frame being flattened as best shown in Fig. 1. Secured to these flattened ends is an auxiliary U-shaped frame 6 in the form of a bar that connects the ends of the frame 5 and is rigidly secured thereto by rivets 7. The auxiliary frame 6 has arms 8, 9 that extend downward and to one side of the plane of the frame 5 and terminate in feet 10 adapted to bear on the ground. The intermediate portions of the arms 8, 9 are provided with longitudinally extending slots 11, as best shown in Figs. 2 and 4, which slots are inclined with reference to the plane of the frame 5, and through said inclined slots passes an axle or shaft 12 upon the outer ends of which are mounted wheels 13, 14. The upper ends of the slots 11 are offset upwardly, as shown at $11^a$, substantially in the plane of the frame 5, so that by moving the axle 12 into the offset portions $11^a$ of the slots 11 any weight imposed on the carrier will tend to hold the axle in said offset portions. By lifting the frame, however, the axle will be free to move down in the grooves to the lower ends thereof, carrying the wheels with it of course. The arrangement of these parts is such that when the axle 12 is in the offset portions $11^a$, the bottoms of the wheels will be on substantially the same level as the feet 10, so that then said feet and the wheels constitute a base which supports the frame 5 in an upright position. As will be hereinafter explained, the load is arranged to be supported over the arms 8, 9, and consequently it aids in holding the frame 5 upright. When the load is to be transported, the frame 5 is lifted sufficiently to release the axle 12 from the recesses $11^a$ so that it can run down in the slots 11. This carries the wheels below the level of the feet 10 and the carrier may then be hauled from place to place, running on the wheels, with the feet 10 clear of the ground. A further advantage of this construction is that when the frame 5 is lifted the wheels automatically move out to one side of the plane of the frame 5, under the load, so that they get out of the way of the one carrying the device, so that his legs will not strike them as he walks. When the carrier is again deposited on the ground the axle 12 automatically returns to the offset portions or recesses 11ª of the slots 11 so that the parts are again adapted to support it in an upright position.

Rising centrally from the frame 5 is a tube 15, the lower end of which is preferably connected with the frame 5 by a cross coupling 16 that also joins the two side members of the frame 5, as best shown in Figs. 1 and 3. This coupling is split as shown at 17 and provided with a clamping screw 18 by which the slot in the coupling may be drawn up to clamp the tube 15, which is fitted telescopically to said coupling. In the arrangement shown in Fig. 1, the tube 15 is extended upward to the limit of its movement, whereas in Fig. 3 it is shown lowered almost to its extreme position in that direction. It may, of course, be set at any intermediate point by tightening the clamping screw 18.

Upon the upper end portion of the tube 15 is mounted a cross-head 19 having hooks 20 at its opposite ends adapted to receive loops 21 or equivalent attaching devices carried by a mail or other bag 22. This arrangement provides convenient means for applying the mail bag to and removing it from the cross-head 19, but any other convenient means for the purpose may be employed. The hooks 20 are arranged to support the bag over that side of the device at which the arms 8, 9 are located, so that the weight of the load exerts downward pressure on the feet 10 and stabilizes the carrier in its upright position. This, however, does not interfere with swinging the frame 5 in the opposite direction when the load is to be wheeled from place to place.

Telescoping within the tube 15 is the stem 23 of a handle 24, said stem being preferably tubular and being fitted to slide in a sleeve 25 that forms the central portion of the cross-head 19. Said sleeve is split, as shown at 26, and the slit therein may be narrowed by a clamping screw 27 to secure the stem 23 at any suitable height. Said stem may also be lowered so as to be practically completely enclosed in the tube 15, as shown in Fig. 3, thereby lowering the handle 24 so that it will be held at a convenient height for carrying the device by hand with the wheels out of operative position.

When the parts are collapsed or folded as shown in Fig. 3, the bag 22 is supported in a low down position, and with the wheels in the position shown in Figs. 1 and 2 the device will be held upright so that the bag may be conveniently loaded or emptied when standing on the floor or on a bench or table. To transport the load, it is best to extend the handle 24 by withdrawing it from the tube 15, as shown in Fig. 1, and the axle 12 is released from the recesses 11ª so that it may run down to the lower ends of the slots 11. By tipping the carrier to the right as viewed in Figs. 2 and 4, it may be conveniently wheeled to transport the load. Ordinarily, the tube 15 would also be extended to lift the bag high enough so that it will be held at a convenient height for the removal of its contents by the postman without stooping. By the use of a device of this kind the letter carrier is relieved of carrying a heavily loaded bag as he makes his rounds, and he may allow the carrier to stand erect on the sidewalk while he makes his deliveries.

It should be understood that our invention is not limited to the specific construction shown and described except in so far as details of such construction are particularly claimed, but includes such alterations or modifications coming within the scope of the appended claims, as would occur to those skilled in the art.

What we claim as our invention and desire to secure by Letters Patent, is—

1. A carrier of the type described comprising a U-shaped member, wheeled means carried at the ends of said member, a T-shaped load supporting member telescopically connected to said U-shaped member, and a handle telescopically connected to said load supporting member.

2. A carrier of the type described comprising a frame, wheeled means carried by said frame, a load supporting member adjustably associated with said frame, and a handle adjustably associated with said load supporting member whereby the effective height of said load supporting member and handle may be varied with respect to the frame and with respect to each other.

3. A carrier of the type described comprising a frame having wheeled means at one end and a handle member associated with said frame at the other end, and a load supporting member adjustably associated with said frame between said wheeled means and said handle member, whereby the effective load supporting position of said load supporting means may be varied between said handle member and wheeled means and with respect to either said handle member or wheeled means or both.

4. A carrier of the type described comprising a frame, wheeled means carried by said frame, a load supporting member comprising a pair of oppositely extending arms adjustably associated with said frame, and a handle adjustably associated with said load supporting member, said arms being disposed between said frame and handle in all adjustable positions of said load supporting member with respect to said frame and handle.

5. A carrier of the type described comprising a frame, wheeled means carried by said frame, a load supporting member comprising a pair of oppositely extending arms adjustably associated with said frame, said arms being adapted to be disposed in coplanar relation with said frame, and a handle adjustably associated with said load supporting member, said arms being disposed between said frame and handle in all adjustable positions of said load supporting member with respect to said frame and handle.

6. A carrier of the type described comprising a frame, wheeled means carried by said frame, a clamping member carried by said frame, a load supporting member telescopically associated with said clamping member, a second clamping member carried by said load supporting member, a handle member telescopically associated with said second clamping member, and means associated with each of said clamping members whereby said clamping members may be rendered effective to retain the respective telescopically associated members in adjusted positions whereby the effective height of said load supporting member with respect to said wheeled means and handle member may be varied.

7. A carrier of the class described comprising a frame, wheeled means carried by said frame, a load supporting means telescopically associated with said frame, and a handle means telescopically associated with said load supporting means, said load supporting and handle means being so collapsible as to reduce the overall length of the carrier to a height slightly greater than the combined height of said frame and wheeled means.

8. A carrier of the class described comprising a U-shaped frame member, wheeled means carried at the ends of said frame member, a load supporting means including a pair of oppositely extending arms and a tubular stem portion, said stem portion being telescopically associated with the central portion of said frame member, and a handle means including a tubular stem portion telescopically associated with said load supporting member tubular stem portion, whereby the positions of said load supporting means and handle means may be varied with respect to said frame member and with respect to each other.

KEITH J. EVANS.
ALFRED O. WILLIAMS.